United States Patent
Liu et al.

(10) Patent No.: US 10,684,382 B2
(45) Date of Patent: Jun. 16, 2020

(54) GENERATING TARGET-ORIENTED ACQUISITION-IMPRINT-FREE PRESTACK ANGLE GATHERS USING COMMON FOCUS POINT OPERATORS

(71) Applicant: Saudi Arabian Oil Company, Dhahran (SA)

(72) Inventors: Hongwei Liu, Dhahran (SA); Mustafa Al-Ali, Bahrain (SA)

(73) Assignee: Saudi Arabian Oil Company, Dhahran (SA)

( * ) Notice: Subject to any disclaimer, the term of this patent is extended or adjusted under 35 U.S.C. 154(b) by 249 days.

(21) Appl. No.: 15/878,094

(22) Filed: Jan. 23, 2018

(65) Prior Publication Data

US 2019/0227183 A1   Jul. 25, 2019

(51) Int. Cl.
  *G01V 1/00*  (2006.01)
  *G01V 1/50*  (2006.01)
  *E21B 49/00* (2006.01)
  *G01V 1/28*  (2006.01)

(52) U.S. Cl.
  CPC .............. *G01V 1/003* (2013.01); *E21B 49/00* (2013.01); *G01V 1/282* (2013.01); *G01V 1/50* (2013.01); *G01V 2210/16* (2013.01); *G01V 2210/21* (2013.01); *G01V 2210/244* (2013.01); *G01V 2210/46* (2013.01); *G01V 2210/512* (2013.01); *G01V 2210/614* (2013.01); *G01V 2210/675* (2013.01)

(58) Field of Classification Search
  CPC ...................................................... G01V 1/003
  USPC ......................................................... 702/14
  See application file for complete search history.

(56) References Cited

U.S. PATENT DOCUMENTS

| 8,120,991 | B2 |   | 2/2012 | Koren et al. | |
|---|---|---|---|---|---|
| 8,209,126 | B2 | * | 6/2012 | Berkovitch | G01V 1/28 702/11 |
| 8,315,124 | B2 | * | 11/2012 | Zhu | G01V 1/364 367/38 |
| 8,531,914 | B2 | * | 9/2013 | Delpart-Jannaud | G01V 1/306 367/56 |

(Continued)

FOREIGN PATENT DOCUMENTS

| EP | 1508058 B1 * | 2/2005 | .............. G01V 1/28 |
|---|---|---|---|
| GB | 2525072 | 10/2015 | |

(Continued)

OTHER PUBLICATIONS

International Search Report and Written Opinion issued in International Application No. PCT/US2019-014488, dated May 13, 2019, 17 pages.

(Continued)

*Primary Examiner* — Ricky Ngon
(74) *Attorney, Agent, or Firm* — Fish & Richardson P.C.

(57) ABSTRACT

A method of generating target-oriented acquisition-imprint-free prestack angle gathers using common focus point (CFP) operators includes receiving a plurality of seismic traces associated with a target point in a reservoir. A first angle domain common image gather (ADCIG) is generated based on the received plurality of seismic traces. A plurality of synthetic traces associated with the target point is generated. A second ADCIG is generated based on the synthetic traces. An enhanced ADCIG is generated using the first ADCIG and the second ADCIG.

17 Claims, 5 Drawing Sheets

(56) References Cited

U.S. PATENT DOCUMENTS

| | | |
|---|---|---|
| 8,760,967 B2 | 6/2014 | Nichols et al. |
| 8,948,463 B2 * | 2/2015 | Landa .................... G01V 1/28 367/25 |
| 9,395,457 B2 | 7/2016 | Poole |
| 9,702,999 B2 | 7/2017 | Sun et al. |
| 10,295,685 B2 | 5/2019 | Zhang et al. |
| 10,324,205 B2 | 6/2019 | Wang et al. |
| 2004/0243312 A1 * | 12/2004 | Schoneville .......... G01V 1/362 702/14 |
| 2010/0212909 A1 * | 8/2010 | Baunnstein ............ G01V 11/00 166/369 |
| 2012/0004849 A1 * | 1/2012 | Aarre .................... G01V 1/28 702/14 |
| 2014/0032119 A1 * | 1/2014 | Landa .................... G01V 1/30 702/14 |
| 2014/0269185 A1 * | 9/2014 | Ferber .................. G01V 1/308 367/38 |
| 2015/0276956 A1 | 10/2015 | Khalil et al. |
| 2015/0355355 A1 | 12/2015 | Guan et al. |
| 2016/0109595 A1 * | 4/2016 | Stork .................... G01V 1/36 367/46 |
| 2016/0327661 A1 * | 11/2016 | Mousa .................. G01V 1/003 |
| 2017/0192118 A1 | 7/2017 | Du et al. |
| 2018/0120464 A1 | 5/2018 | Sun et al. |
| 2018/0143334 A1 | 5/2018 | Hegna et al. |
| 2018/0143337 A1 | 5/2018 | Koren et al. |
| 2018/0180755 A1 | 6/2018 | Yan |
| 2018/0364374 A1 | 12/2018 | Brenders et al. |
| 2019/0179045 A1 | 6/2019 | Zhan et al. |

FOREIGN PATENT DOCUMENTS

| | | |
|---|---|---|
| GB | 2530126 | 3/2016 |
| WO | WO2012051267 | 4/2012 |
| WO | WO2015051267 | 4/2015 |
| WO | 2490584 | 4/2017 |
| WO | WO2018187461 | 10/2018 |
| WO | WO2019055565 A | 3/2019 |

OTHER PUBLICATIONS

Mahmoudian et al., "Angle-domain CIG: A review of angle domain common image gathers,", CREWES Research Report—vol. 1, Jan. 1, 2009, 22 pages.

Van Veldhuizen, "Integrated approach to 3-D seismic acquisition geometry analysis," Technische Universiteit Delft, Sep. 19, 2006, 192 pages.

"Shen et al," "Azimuthal offset-dependent attributes applied to fracture detection in a carbonate reservoir," "Geophysics, vol. 67. No. 2 (Mar.-Apr. 2002): pp. 355-364, 10 pages".

* cited by examiner

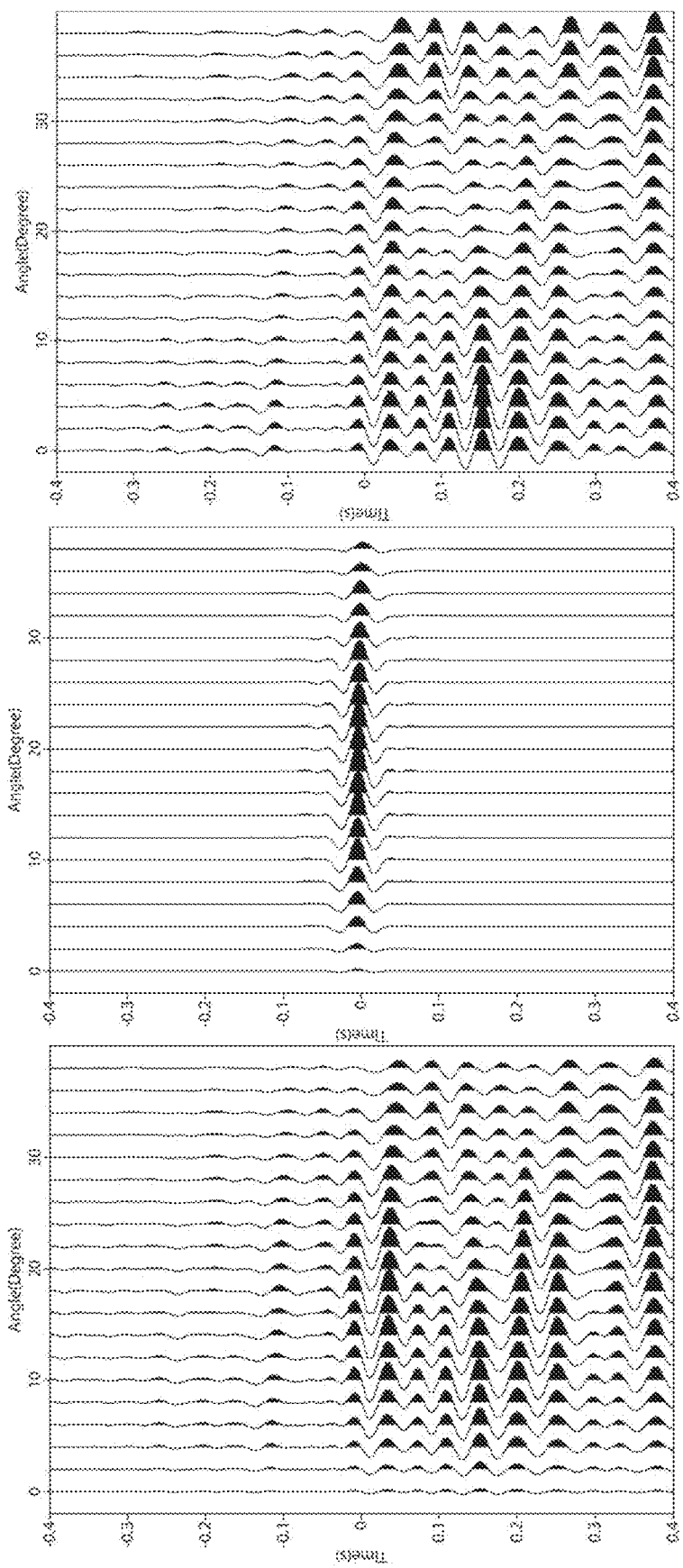

U.S. 10,684,382 B2

GENERATING TARGET-ORIENTED ACQUISITION-IMPRINT-FREE PRESTACK ANGLE GATHERS USING COMMON FOCUS POINT OPERATORS

TECHNICAL FIELD

This disclosure relates to seismic data processing.

BACKGROUND

Seismic data can be collected for a reservoir, including one or more subsurface layers, by sending seismic waves to the reservoir at multiple source locations and recording reflected waves at multiple receiver locations. The seismic data can be used to build seismic images for analyzing subsurface structure and lithology of the reservoir so that effective oil and gas exploration can be performed.

SUMMARY

The present disclosure describes generating target-oriented acquisition-imprint-free prestack angle gathers using common focus point (CFP) operators.

In an implementation, a plurality of seismic traces associated with a target point in a reservoir is received. A first angle domain common image gather (ADCIG) is generated based on the received plurality of seismic traces. A plurality of synthetic traces associated with the target point is generated. A second ADCIG is generated based on the synthetic traces. An enhanced ADCIG is generated using the first ADCIG and the second ADCIG.

Implementations of the described subject matter, including the previously described implementation, can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented in particular implementations to realize one or more of the following advantages. The described approach can efficiently generate prestack angle domain common image gathers (ADCIGs) using CFP operators without deriving a detailed velocity model. An amplitude balancing technique is used so that the generated ADCIGs are independent of an acquisition geometry and have correct amplitude versus offset (AVO) information for reservoir characterization. The generated acquisition-imprint-free ADCIGs enable effective oil and gas exploration.

The details of one or more implementations of the subject matter of this specification are set forth in the detailed description, the claims, and the accompanying drawings. Other features, aspects, and advantages of the subject matter will become apparent to those of ordinary skill in the art from the detailed description, the claims, and the accompanying drawings.

DESCRIPTION OF DRAWINGS

FIG. 3A illustrates an angle domain common image gather (ADCIG) based on recorded seismic data, according to some implementations of the present disclosure.

FIG. 3B illustrates an ADCIG based on synthetic data, according to some implementations of the present disclosure.

FIG. 3C illustrates a final ADCIG after applying amplitude balancing, according to some implementations of the present disclosure.

Like reference numbers and designations in the various drawings indicate like elements.

DETAILED DESCRIPTION

Figure 1:
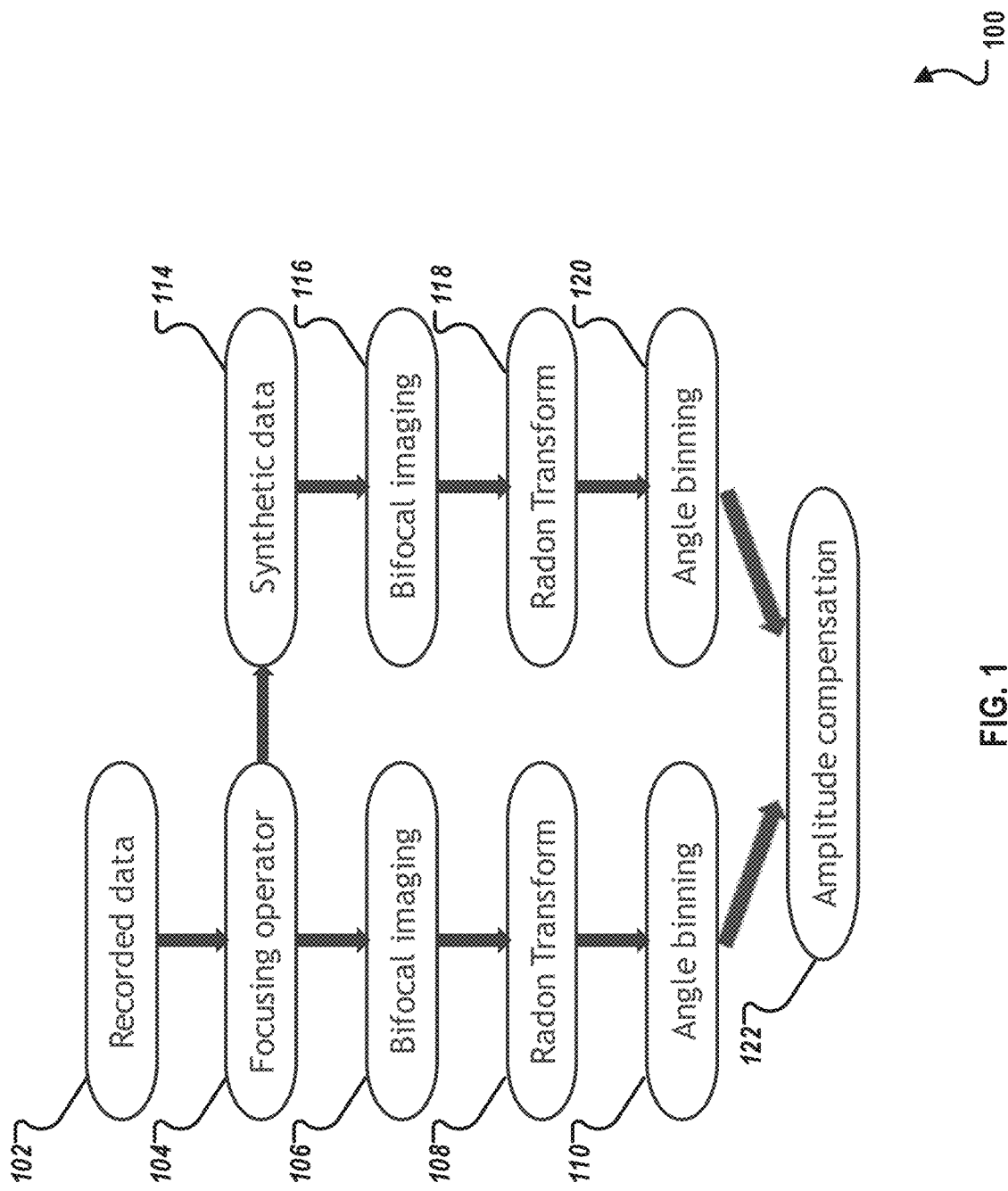
FIG. 1 is a flowchart illustrating an example of a computer-implemented method for generating target-oriented acquisition-imprint-free prestack angle gathers using common focus point (CFP), according to some implementations of the present disclosure.

The following detailed description describes generating target-oriented acquisition-imprint-free prestack angle gathers using common focus point (CFP) technologies, and is presented to enable any person skilled in the art to make and use the disclosed subject matter in the context of one or more particular implementations. Various modifications, alterations, and permutations of the disclosed implementations can be made and will be readily apparent to those of ordinary skill in the art. The general principles defined in the disclosed implementations can be applied to other implementations and applications, without departing from the scope of the present disclosure. In some instances, one or more technical details that are unnecessary to obtain an understanding of the described subject matter and that are within the skill of one of ordinary skill in the art may be omitted so as to not obscure one or more described implementations. The present disclosure is not intended to be limited to the described or illustrated implementations, but to be accorded the widest scope consistent with the described principles and features.

Amplitude verses Offset (AVO) analysis can be used for reservoir characterization. AVO analysis is based on the generation of prestack angle domain common image gathers (ADCIGs), which uses the estimation of wavefields within the solid earth's interior where no direct observations are available. In some cases, standard estimation based on seismic data recorded along an open boundary of surface receivers is insufficient to explain how energy propagates in the complex subsurface unless high-resolution seismic velocity models are available prior to imaging or otherwise multiple scattered waves (multiples) in the subsurface are not accurately predicted. In some cases, rigorous depth-oriented velocity estimation methods are used for the overburden to produce sufficiently accurate velocity models.

At a high level, the described approach generates prestack target-oriented acquisition-imprint-free ADCIGs using CFP operators without deriving a detailed velocity model. The CFP operators can be derived using a simple, robust, and iterative operator-updating procedure. An amplitude balancing technology is used so that the generated prestack ADCIGs are independent of the acquisition geometry (that is, acquisition-imprint-free) and have correct AVO information. A prestack ADCIG is generated for each target point in the reservoir (that is, target-oriented). In some implementations, for each target point (or target reflector) in the reservoir, recorded seismic traces are processed using CFP operators to form a bifocal image. Radon transform and angle binning are performed on the bifocal image to generate a first ADCIG for the target point. A second ADCIG is generated for the same target point using synthetic traces generated based on the same acquisition geometry as the recorded seismic traces. A final prestack acquisition-imprint-free ADCIG for that target point is generated using an amplitude balancing technology which corrects the amplitudes of the first ADCIG based on the amplitudes of the second ADCIG. Prestack acquisition-imprint-free ADCIGs can be generated for multiple target points in the reservoir, and these prestack ADCIGs can be further processed and used to characterize the reservoir for effective oil and gas exploration.

FIG. 1 is a flowchart illustrating an example of a computer-implemented method 100 for generating target-oriented acquisition-imprint-free prestack angle gathers using CFP, according to some implementations of the present disclosure. For clarity of presentation, the description that follows generally describes method 100 in the context of the other figures in this description. However, it will be understood that method 100 can be performed, for example, by any system, environment, software, and hardware, or a combination of systems, environments, software, and hardware, as appropriate. In some implementations, various steps of method 100 can be run in parallel, in combination, in loops, or in any order. The method 100 is used for each target point (or target reflector) in a reservoir.

At 102, recorded seismic data is received. In some cases, seismic data can be collected for the reservoir, including one or more subsurface layers, by sending seismic waves to the reservoir at multiple source locations and recording reflected waves at multiple receiver locations. For example, a seismic source can fire a shot at a source location for a receiver to record the reflected wave. The recorded data at each receiver corresponding to a single shot is called a seismic trace. The seismic trace can include sampled values of the reflected wave by sampling the reflected wave at a regular time interval. For instance, if the seismic source fired shots at 10 different locations and there are 100 receivers, the recorded seismic data has 1000 seismic traces. The reservoir can include multiple reflectors, and each reflector can have a reflection coefficient associated with reflecting seismic waves. For example, the three-dimensional (3D) reservoir can be evenly divided into small cubes, and each cube represents one reflector (subsurface gridpoint or point). From 102, method 100 proceeds to 104.

At 104, CFP focusing operators are derived for a chosen target point or reflector. In some cases, CPF focusing operators are one-way Green's functions, and data-driven estimation of the CFP focusing operators can be used. The CFP operator $F(z_0, z_m)$ describes a propagation time between an acquisition surface $z_0$ ($z_0$ may indicate the surface level of the shot locations or receivers) and the chosen target reflector $z_m$ ($z_m$ may indicate the depth level of the target reflector). In some cases, the described approach can integrate conventional static solutions in the initial and updated CFP operators.

In some implementations, the CFP operator $F(z_0, z_m)$ can be iteratively derived. For example, an initial CFP operator can be a rough estimation of the traveltime between the acquisition surface $z_0$ and the chosen target reflector $z_m$. The equal-traveltime principle indicates that the traveltimes of the target reflections in each CFP gather are the same as the time-reverse of the respective focusing operator if the kinematics of the operator are correct. According to this principle, the differential time-shift (DTS) gathers can be generated by time correlating the focusing operators, trace by trace, to their respective CFP gathers. Based on an automated picking on the DTS gathers, the initial focusing operators are updated iteratively until the principle of equal-traveltime is fulfilled (that is, the target event in DTS becomes flat) for each target reflector. From 104, method 100 proceeds to 106 and 114.

At 106, bifocal imaging is performed using the CFP focusing operators derived in 104. If focusing in detection at a k-th subsurface, and gridpoint is applied followed by focusing in emission at a j-th subsurface gridpoint around the k-th subsurface gridpoint, the bifocal imaging can be expressed mathematically as:

$$P_{jk}(\omega, z_m, z_m, h_x, h_y) = F^*_j(z_m, z_0) P(z_0, z_0) F_k(z_0, z_m), \quad (1)$$

where $P(z_0, z_0)$ is the recorded seismic data at the acquisition surface $z_0$, $F_k(z_0, z_m)$ is the CFP operator for detection focusing, $F^*_j(z_m, z_0)$ is the CFP operator for emission focusing (operator * indicates element-by-element complex conjugate), and $P_{jk}(\omega, z_m, z_m, h_x, h_y)$ is the bifocal imaging result. In the bifocal imaging result, $h_x$ and $h_y$ are the local offsets between the k-th and the j-th subsurface gridpoints in x-direction and y-direction, respectively, and $\omega$ represents an angular frequency. In some cases, the k-th gridpoint represents the target point, $z_m$ indicates the depth level of the target point, and multiple j-th gridpoints can be selected around the k-th gridpoint (the k-th gridpoint is the center point). The operation of Equation (1) is performed in a Fourier transform domain.

For example, in the example of 10 shot locations and 100 receivers, $P(z_0, z_0)$ can be a 10×100 matrix representing the 1000 recorded seismic traces, $F_k(z_0, z_m)$ can be a 100×1 column vector representing the propagation times between the 100 receivers and the target reflector $z_m$, and $F^*_j(z_m, z_0)$ can be a 1×10 row vector representing the propagation times between the 10 shot locations and the target reflector $z_m$. After applying the detection focusing (that is, applying the CFP operator $F_k(z_0, z_m)$), the 100 receivers become a virtual receiver positioned at the k-th gridpoint. After applying the emission focusing (that is, applying the CFP operator $F^*_j(z_m, z_0)$), the 10 shot locations become a virtual shot location at the j-th gridpoint. In some cases, Equation (1) is applied to multiple j-th gridpoints around the k-th gridpoint, and the results represent a bifocal image gather for the k-th gridpoint. From 106, method 100 proceeds to 108.

At 108, an invertible 3D Radon transform is applied on the bifocal imaging result derived in 106. For example, the following invertible 3D Radon transform can be used where the double Rho-filter $\omega^2$ can preserve frequency components before and after the Radon transform:

$$P(t, p_x, p_y) = \iiint \omega^2 P_{jk}(\omega, z_m, z_m, h_x, h_y) e^{-i\omega(t - p_x h_x - p_y h_y)} d\omega dh_x dh_y, \quad (2)$$

where $P(t, p_x, p_y)$ is called amplitude versus ray-parameter (AVP) imprint function, $p_x$ and $p_y$ are ray-parameters along x and y directions, and t represents a time. The main objective of the AVP-imprint function is to quantitatively evaluate effects of the acquisition geometry on the angle-dependent reflectivity included in the acquired seismic data. As a result, an angle-independent reflector with zero dip can be used. Under this assumption, the AVP imprint function can be further converted to an ADCIG. From 108, method 100 proceeds to 110.

At 110, a first ADCIG for the target point is generated by angle binning. For example, the angle binning is performed using the following Equations (3) and (4) to convert the AVP imprint function in Equation (2) to an ADCIG:

$$P(t,\theta) = \iint P(t,p_x,p_y)\delta(\theta-\theta_0)dp_x dp_y, \quad (3)$$

where $$\theta_0 = \sin^{-1}(v_0\sqrt{p_x^2+p_y^2}). \quad (4)$$

where $P(t, \theta)$ represents the ADCIG for the target point, $\theta$ represents an angle, $\theta_0$ represents the angle corresponding to the ray-parameters $p_x$ and $p_y$, and $\delta$ represents a delta function. In some implementations, a normal moveout (NMO) velocity defined at the target horizon is used as $v_0$ in Equation (4). In some cases, the NMO velocity at the target horizon is generated in the stage of time domain data processing, and based on human or auto-picking of the semblance (for example, based on an appearance of the seismic traces) or the stack power (for example, based on a peak signal power of the stacked seismic traces) in a common depth point (CDP) gather. The ADCIG in Equation (3) can be further used for AVO analysis. From 110, method 100 proceeds to 122.

In some cases, the ADCIG generated by Equation (3) is not AVO-correct, especially for irregular acquisition geometries. Although some post migration corrections, such as residual amplitude analysis and compensation (RAAC), spectral whitening, amplitude balancing, spatial adaptive wavelet estimation (SAWE), and spatial adaptive wavelet processing (SAWP), may be used to generate AVO-correct ADCIGs, in some cases, these post migration corrections are not preferred to be applied. In the described approach, an amplitude balancing technology is further applied to the ADCIG in Equation (3) so that the final ADCIG is AVO-correct and independent of the acquisition geometry.

At 114, synthetic traces (or synthetic data) are generated for the target point using the following equation:

$$P_{syn}(z_0,z_0,x_s,x_r) = A_s A_r e^{-i\omega(T_s+T_r)}, \quad (5)$$

where $A_s$ is the synthetic amplitude of the Green function between the shot $x_s$ and the target point, and $A_r$ is the synthetic amplitude of the Green function between the receiver $x_r$ and the target point. In some cases, $A_s$ and $A_r$ can be determined by analytical solutions. In addition, $T_s$ is the traveltime between the shot $x_s$ and the target point, $T_r$ is the traveltime between the receiver $x_r$ and the target point. The CFP operators for the target point are used to calculate the traveltimes between the target point and shot locations and between the target point and receiver locations. Spherical diffusion is applied for the amplitude which means that the reflection coefficients of the synthetic traces are independent of incident angles. The synthetic traces are generated trace-by-trace using the same acquisition geometry as that of the recorded seismic traces (that is, $P(z_0,z_0)$ in Equation (1)). As will be described in steps 116-120, the same process as described in steps 106-110 (or Equations (1)-(3)) is applied on the synthetic traces to generate a second ADCIG for the target point. From 114, method 100 proceeds to 116.

At 116, similar to 106, bifocal imaging is performed on the synthetic traces. For example, $$P_{jk,syn}(\omega,z_m,z_m,h_x,h_y) = F^*_j(z_m,z_0)P_{syn}(z_0,z_0,x_s,x_r)F_k(z_0,z_m), \quad (6)$$

where the same CFP focusing operators $F_k(z_0,z_m)$ and $F^*_j(z_m,z_0)$ in Equation (1) are used in Equation (6). From 116, method 100 proceeds to 118.

At 118, similar to 108, the invertible 3D Radon transform is applied on the bifocal imaging result based on the synthetic traces. For example, $$P_{syn}(t,p_x,p_y) = \iiint \omega^2 P_{jk,syn}(\omega,z_m,z_m,h_x,h_y)e^{-i\omega(t-p_x h_x-p_y h_y)}d\omega dh_x dh_y. \quad (7)$$

From 118, method 100 proceeds to 120.

At 120, similar to 110, a second ADCIG for the target point is generated based on the synthetic traces by angle binning. For example, the angle binning is performed using $$P_{syn}(t,\theta) = \iint P_{syn}(t,p_x,p_y)\delta(\theta-\theta_0)dp_x dp_y, \quad (8)$$

where $\theta_0$ in Equation (4) is used. From 120, method 100 proceeds to 122.

At 122, amplitude compensation (or amplitude balancing) is used to generate a final ADCIG for the target point. For example, the amplitudes of the ADCIG based on the recorded data (that is, the first ADCIG in Equation (3)) are compensated or corrected by the amplitudes of the ADCIG based on the synthetic traces (that is, the second ADCIG in Equation (8)). The final prestack acquisition-imprint-free ADCIG can be generated by $$\tilde{P}(t,\theta) = \frac{P(t,\theta)}{|P_{syn}(t,\theta)|+\varepsilon}, \quad (9)$$

where $|P_{syn}(t,\theta)|$ represents an amplitude of $P_{syn}(t,\theta)$, and $\varepsilon$ is a small value for avoiding instability issues. For example, $\varepsilon$ can be 0.001. The final ADCIG in Equation (9) is independent of the acquisition geometry and has correct AVO information. After 122, method 100 stops.

In some implementations, the operations in steps 104-122 are performed to generate an acquisition-imprint-free ADCIG for one target point. Steps 104-122 are repeated for each target point in the reservoir. The ADCIGs of multiple target points are used to perform AVO analysis for reservoir characterization. For example, the generated ADCIGs can be used to build seismic images for providing information of subsurface structure and lithology of the reservoir to reveal possible crude oil- and natural gas-bearing formations. Based on the seismic images, oil wells can be drilled or drilling parameters can be generated or updated for effective oil and gas exploration.

The described approach has been applied to a $CO_2$ injection project. In this project, a full 3D seismic survey is carried out every month with a dense shot distribution (10 m intervals on both x and y directions) and 1000 buried receivers at a depth of 70 m below the surface. The receivers are buried to mitigate the influence of near surface complexity and to enhance the repeatability between surveys. The reciprocity is employed on the baseline survey acquired prior to $CO_2$ injection to generate CFP focusing operators. The described approach is used to generate efficient and accurate 3D target-oriented seismic images from time-lapse field seismic datasets acquired in the $CO_2$ injection project. Applying the described CFP-based target-oriented imaging technology to the time-lapse datasets revealed changes at a reservoir level, which are consistent with the $CO_2$ injection history. The described approach also provides a powerful and practical tool for improving lithology prediction and four-dimensional (4D) signature analysis. The described approach enables quick data processing and monitoring the $CO_2$ movement within the reservoir without going through lengthy and costly full depth imaging of the entire 3D datasets.

Figure 2B:
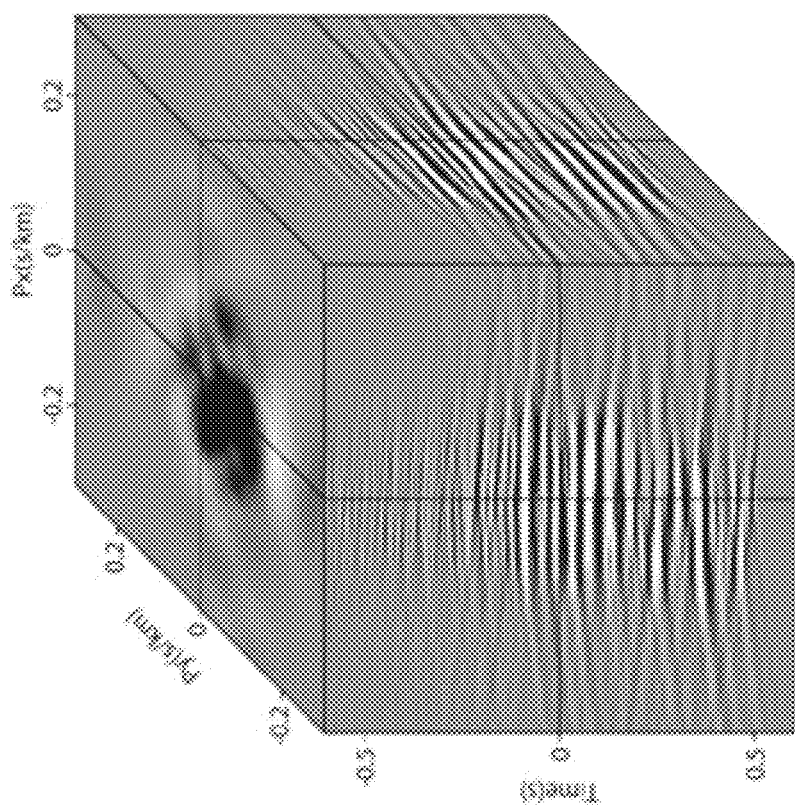
FIG. 2B illustrates an amplitude versus ray-parameter (AVP) imprint function, according to some implementations of the present disclosure.
Figure 2A:
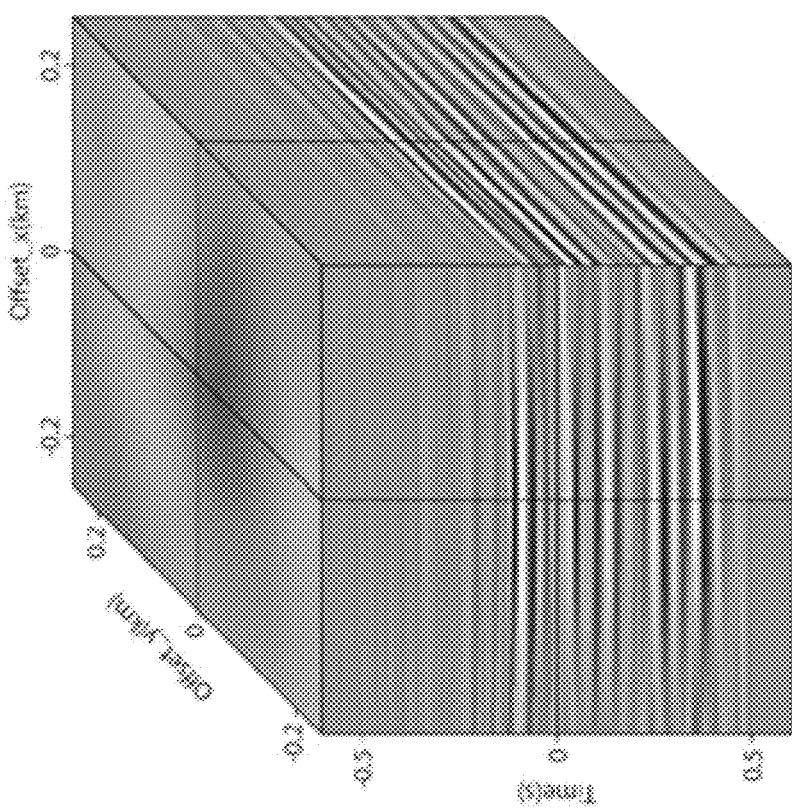
FIG. 2A illustrates a bifocal imaging result for one target point, according to some implementations of the present disclosure.

FIG. 2A illustrates a bifocal imaging result 200a for one target point, according to some implementations of the present disclosure. The bifocal imaging result 200a can be generated by Equation (1), where $h_x$ and $h_y$ in Equation (1) are represented by axes Offset_x and Offset_y in FIG. 2A, respectively.

FIG. 2B illustrates an AVP imprint function 200b, according to some implementations of the present disclosure. The AVP imprint function 200b is generated by applying the invertible Radon transform in Equation (2) on the bifocal imaging result 200a in FIG. 2A.

FIG. 3A illustrates an ADCIG 300a based on recorded seismic data, according to some implementations of the present disclosure. FIG. 3B illustrates an ADCIG 300b based on synthetic data, according to some implementations of the present disclosure. FIG. 3C illustrates a final ADCIG 300c after applying amplitude balancing, according to some implementations of the present disclosure. The ADCIGs 300a, 300b, and 300c are for a same target point. The ADCIG 300a is generated by Equation (3), the ADCIG 300b is generated by Equation (8), and the ADCIG 300c is generated by Equation (9). FIG. 3A shows that amplitudes of some traces (for example, the trace at angle zero) are small due to, for example, the irregular acquisition geometry. FIG. 3C shows that after amplitude balancing, the traces in the ADCIG are independent of the acquisition geometry and AVO-correct (for example, the amplitude of the trace at angle zero is recovered).

Figure 4:
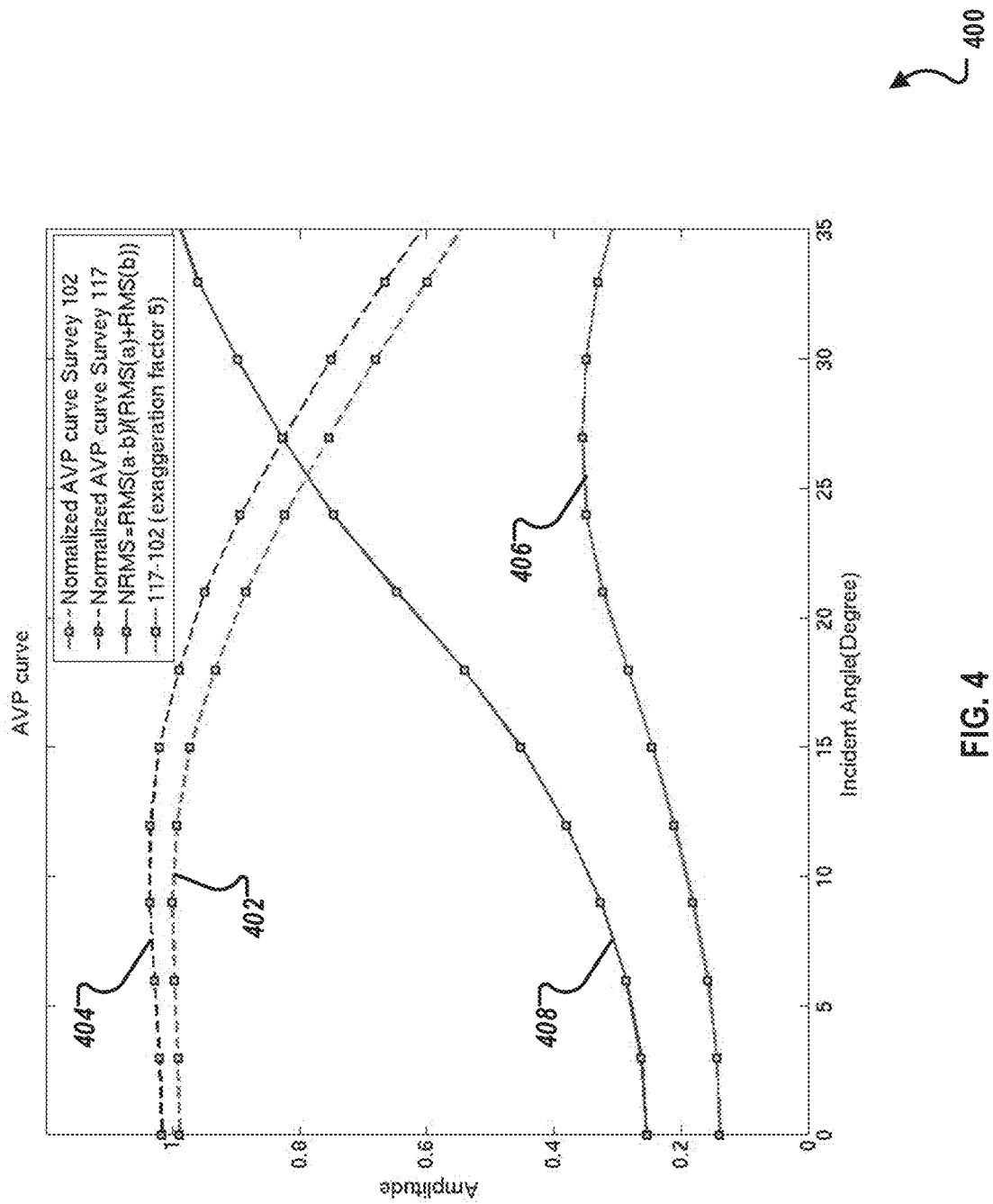
FIG. 4 illustrates results of an amplitude versus angle (AVA) analysis, according to some implementations of the present disclosure.

FIG. 4 illustrates results 400 of an amplitude versus angle (AVA) analysis, according to some implementations of the present disclosure. The described approach is applied on two surveys which are a baseline survey and a monitor survey (performed 15 months after the baseline survey). For each survey, acquisition-imprint-free ADCIGs are generated using the described approach, and AVA analysis is performed on the generated ADCIGs. FIG. 4 shows results of the AVA analysis for a particular target point. Curves 402 and 404 are normalized root mean square (RMS) AVA curves for that target point from the baseline survey (survey 102) and the monitor survey (survey 117), respecitvely. Curves 402 and 404 are normalized with respect to the maximum value of the curve 402. A curve 406 illustrates a differential RMS (DRMS) between the curves 402 and 404 with an exaggeration factor 5. The curve 406 is generated by multiplying the difference between the curves 402 and 404 by a factor 5. A curve 408 illustrates a normalized DRMS and is generated by normalizing the curve 406 with respect to the maximum value of the curve 402.

The AVA curves 402 and 404 each demonstrate a decrease in amplitude with increasing angles at a top of the reservoir, or a response which is consistent with monitor well logs. The AVA curve 404 has larger amplitude values than the AVA curve 402, which demonstrates a brightening of amplitude for an increase in $CO_2$ saturation in the reservoir, and fits the conceptual model (the slope of the AVA curve is smaller for $CO_2$ than for brine saturated rock). The DRMS curves 406 and 408 illustrate that the amplitude differences between the baseline survey and the monitor survey increase with angles, which is consistent with rock physics. The DRMS curves 406 and 408 also demonstrate that DRMS has more contrast on the fars (large angles) than on the nears (small angles). The consistency between the AVA analysis result and monitor well logs validates the effectiveness of the described approach.

Figure 5:
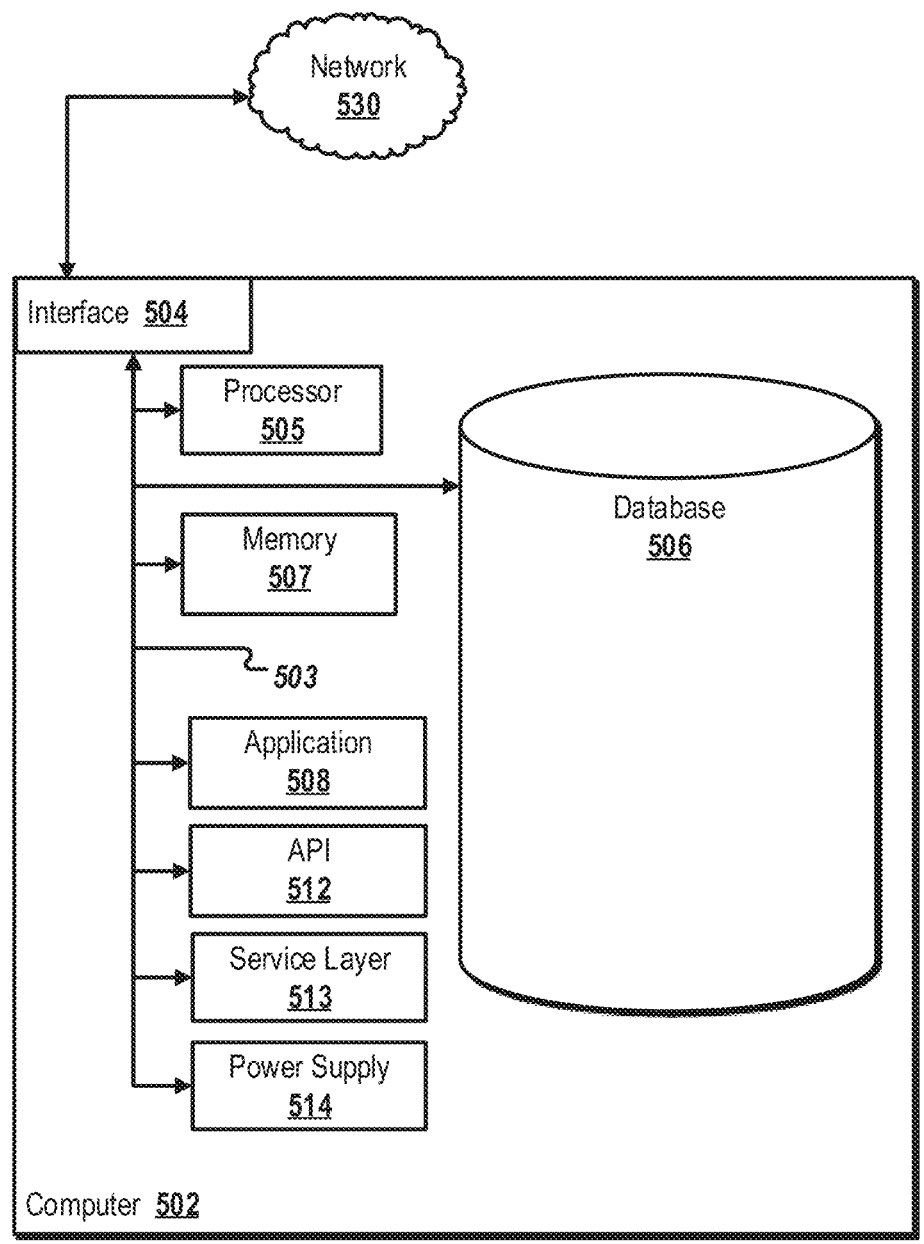
FIG. 5 is a block diagram illustrating an example of a computer-implemented system used to provide computational functionalities associated with described algorithms, methods, functions, processes, flows, and procedures, according to an implementation of the present disclosure.

FIG. 5 is a block diagram illustrating an example of a computer-implemented system 500 used to provide computational functionalities associated with described algorithms, methods, functions, processes, flows, and procedures, according to an implementation of the present disclosure. In the illustrated implementation, system 500 includes a computer 502 and a network 530.

The illustrated computer 502 is intended to encompass any computing device such as a server, desktop computer, laptop/notebook computer, wireless data port, smart phone, personal data assistant (PDA), tablet computer, one or more processors within these devices, or a combination of computing devices, including physical or virtual instances of the computing device, or a combination of physical or virtual instances of the computing device. Additionally, the computer 502 can include an input device (such as a keypad, keyboard, touch screen, or a combination of input devices that can accept user information), and an output device that conveys information associated with the operation of the computer 502 (for example, conveying digital data, visual, audio, or a combination of types of information on a graphical-type user interface (UI) (or GUI) or other UI).

The computer 502 can serve in a role in a distributed computing system as a client, network component, a server, a database, or a combination of roles for performing the subject matter described in the present disclosure. The illustrated computer 502 is communicably coupled with a network 530. In some implementations, one or more components of the computer 502 can be configured to operate within an environment, including cloud-computing-based, local, global, or a combination of environments.

At a high level, the computer 502 is an electronic computing device operable to receive, transmit, process, store, or manage data and information associated with the described subject matter. According to some implementations, the computer 502 can also include or be communicably coupled with a server, including an application server, e-mail server, web server, caching server, streaming data server, or a combination of servers.

The computer 502 can receive requests over the network 530 (for example, from a client software application executing on another computer) and respond to the received requests by processing the received requests using a software application or a combination of software applications. In addition, requests can also be sent to the computer 502 from internal users (for example, from a command console or by another internal access method), external or third-parties, or other entities, individuals, systems, or computers.

Each of the components of the computer 502 can communicate using a system bus 503. In some implementations, any or all of the components of the computer 502, including hardware, software, or a combination of hardware and software, can interface over the system bus 503 using an application programming interface (API) 512, a service layer 513, or a combination of the API 512 and service layer 513. The API 512 can include specifications for routines, data structures, and object classes. The API 512 can be either computer-language independent or dependent and refer to a complete interface, a single function, or even a set of APIs. The service layer 513 provides software services to the computer 502 or other components (whether illustrated or not) that are communicably coupled to the computer 502. The functionality of the computer 502 can be accessible for all service consumers using the service layer 513. Software services, such as those provided by the service layer 513, provide reusable, defined functionalities through a defined interface. For example, the interface can be software written in JAVA, C++, or a combination of computing languages providing data in extensible markup language (XML) format or a combination of formats. While illustrated as an integrated component of the computer 502, alternative implementations can illustrate the API 512 or the service layer 513 as stand-alone components in relation to other components of the computer 502 or other components (whether illustrated or not) that are communicably coupled to the computer 502. Moreover, any or all parts of the API 512 or the service layer 513 can be implemented as a child or a sub-module of another software module, enterprise application, or hardware module without departing from the scope of the present disclosure.

The computer 502 includes an interface 504. Although illustrated as a single interface 504, two or more interfaces 504 can be used according to particular needs, desires, or particular implementations of the computer 502. The interface 504 is used by the computer 502 for communicating with another computing system (whether illustrated or not) that is communicatively linked to the network 530 in a distributed environment. Generally, the interface 504 is operable to communicate with the network 530 and includes logic encoded in software, hardware, or a combination of software and hardware. More specifically, the interface 504 can include software supporting one or more communication protocols associated with communications such that the network 530 or hardware of interface 504 is operable to communicate physical signals within and outside of the illustrated computer 502.

The computer 502 includes a processor 505. Although illustrated as a single processor 505, two or more processors 505 can be used according to particular needs, desires, or particular implementations of the computer 502. Generally, the processor 505 executes instructions and manipulates data to perform the operations of the computer 502 and any algorithms, methods, functions, processes, flows, and procedures as described in the present disclosure.

The computer 502 also includes a database 506 that can hold data for the computer 502, another component communicatively linked to the network 530 (whether illustrated or not), or a combination of the computer 502 and another component. For example, database 506 can be an in-memory or conventional database storing data consistent with the present disclosure. In some implementations, database 506 can be a combination of two or more different database types (for example, a hybrid in-memory and conventional database) according to particular needs, desires, or particular implementations of the computer 502 and the described functionality. Although illustrated as a single database 506, two or more databases of similar or differing types can be used according to particular needs, desires, or particular implementations of the computer 502 and the described functionality. While database 506 is illustrated as an integral component of the computer 502, in alternative implementations, database 506 can be external to the computer 502.

The computer 502 also includes a memory 507 that can hold data for the computer 502, another component or components communicatively linked to the network 530 (whether illustrated or not), or a combination of the computer 502 and another component. Memory 507 can store any data consistent with the present disclosure. In some implementations, memory 507 can be a combination of two or more different types of memory (for example, a combination of semiconductor and magnetic storage) according to particular needs, desires, or particular implementations of the computer 502 and the described functionality. Although illustrated as a single memory 507, two or more memories 507 or similar or differing types can be used according to particular needs, desires, or particular implementations of the computer 502 and the described functionality. While memory 507 is illustrated as an integral component of the computer 502, in alternative implementations, memory 507 can be external to the computer 502.

The application 508 is an algorithmic software engine providing functionality according to particular needs, desires, or particular implementations of the computer 502, particularly with respect to functionality described in the present disclosure. For example, application 508 can serve as one or more components, modules, or applications. Further, although illustrated as a single application 508, the application 508 can be implemented as multiple applications 508 on the computer 502. In addition, although illustrated as integral to the computer 502, in alternative implementations, the application 508 can be external to the computer 502.

The computer 502 can also include a power supply 514. The power supply 514 can include a rechargeable or non-rechargeable battery that can be configured to be either user- or non-user-replaceable. In some implementations, the power supply 514 can include power-conversion or management circuits (including recharging, standby, or another power management functionality). In some implementations, the power supply 514 can include a power plug to allow the computer 502 to be plugged into a wall socket or another power source to, for example, power the computer 502 or recharge a rechargeable battery.

There can be any number of computers 502 associated with, or external to, a computer system containing computer 502, each computer 502 communicating over network 530. Further, the term "client," "user," or other appropriate terminology can be used interchangeably, as appropriate, without departing from the scope of the present disclosure. Moreover, the present disclosure contemplates that many users can use one computer 502, or that one user can use multiple computers 502.

Described implementations of the subject matter can include one or more features, alone or in combination.

For example, in a first implementation, a computer-implemented method, comprising: receiving a plurality of seismic traces associated with a target point in a reservoir; generating a first ADCIG based on the received plurality of seismic traces; generating a plurality of synthetic traces associated with the target point; generating a second ADCIG based on the synthetic traces; and generating an enhanced ADCIG using the first ADCIG and the second ADCIG.

The foregoing and other described implementations can each, optionally, include one or more of the following features:

A first feature, combinable with any of the following features, where the first ADCIG is generated by: performing bifocal imaging on the plurality of seismic traces using detection focusing operators and emission focusing operators; performing a Radon Transform on results of the bifocal imaging; and generating the first ADCIG based on results of the Radon Transform.

A second feature, combinable with any of the previous or following features, where the Radon Transform comprises a double-Rho filter.

A third feature, combinable with any of the previous or following features, where the plurality of synthetic traces is generated based on an acquisition geometry same as that of the received plurality of seismic traces.

A fourth feature, combinable with any of the previous or following features, where the enhanced ADCIG is generated by dividing the first ADCIG by amplitudes of the second ADCIG.

A fifth feature, combinable with any of the previous or following features, where the enhanced ADCIG is independent of an acquisition geometry.

A sixth feature, combinable with any of the previous or following features, further comprising: generating a seismic image based on the enhanced ADCIG; and generating drilling parameters based on the seismic image.

In a second implementation, a non-transitory, computer-readable medium storing one or more instructions executable by a computer system to perform operations comprising: receiving a plurality of seismic traces associated with a target point in a reservoir; generating a first ADCIG based on the received plurality of seismic traces; generating a plurality of synthetic traces associated with the target point; generating a second ADCIG based on the synthetic traces; and generating an enhanced ADCIG using the first ADCIG and the second ADCIG.

The foregoing and other described implementations can each, optionally, include one or more of the following features:

A first feature, combinable with any of the following features, where the first ADCIG is generated by: performing bifocal imaging on the plurality of seismic traces using detection focusing operators and emission focusing operators; performing a Radon Transform on results of the bifocal imaging; and generating the first ADCIG based on results of the Radon Transform.

A second feature, combinable with any of the previous or following features, where the Radon Transform comprises a double-Rho filter.

A third feature, combinable with any of the previous or following features, where the plurality of synthetic traces is generated based on an acquisition geometry same as that of the received plurality of seismic traces.

A fourth feature, combinable with any of the previous or following features, where the enhanced ADCIG is generated by dividing the first ADCIG by amplitudes of the second ADCIG.

A fifth feature, combinable with any of the previous or following features, where the enhanced ADCIG is independent of an acquisition geometry.

A sixth feature, combinable with any of the previous or following features, where the operations further comprise: generating a seismic image based on the enhanced ADCIG; and generating drilling parameters based on the seismic image.

In a third implementation, a computer-implemented system, comprising: one or more computers; and one or more computer memory devices interoperably coupled with the one or more computers and having tangible, non-transitory, machine-readable media storing one or more instructions that, when executed by the one or more computers, perform one or more operations comprising: receiving a plurality of seismic traces associated with a target point in a reservoir; generating a first ADCIG based on the received plurality of seismic traces; generating a plurality of synthetic traces associated with the target point; generating a second ADCIG based on the synthetic traces; and generating an enhanced ADCIG using the first ADCIG and the second ADCIG.

The foregoing and other described implementations can each, optionally, include one or more of the following features:

A first feature, combinable with any of the following features, where the first ADCIG is generated by: performing bifocal imaging on the plurality of seismic traces using detection focusing operators and emission focusing operators; performing a Radon Transform on results of the bifocal imaging; and generating the first ADCIG based on results of the Radon Transform.

A second feature, combinable with any of the previous or following features, where the Radon Transform comprises a double-Rho filter.

A third feature, combinable with any of the previous or following features, where the plurality of synthetic traces is generated based on an acquisition geometry same as that of the received plurality of seismic traces.

A fourth feature, combinable with any of the previous or following features, where the enhanced ADCIG is generated by dividing the first ADCIG by amplitudes of the second ADCIG.

A fifth feature, combinable with any of the previous or following features, where the one or more operations further comprise: generating a seismic image based on the enhanced ADCIG; and generating drilling parameters based on the seismic image.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or an equivalent term as understood by one of ordinary skill in the art) refer to data processing hardware and encompass all kinds of apparatuses, devices, and machines for processing data, including by way of example, a programmable processor, a computer, or multiple processors or computers. The computer can also be, or further include special purpose logic circuitry, for example, a central processing unit (CPU), an FPGA (field programmable gate array), or an ASIC (application-specific integrated circuit). In some implementations, the computer or computer-implemented system or special purpose logic circuitry (or a combination of the computer or computer-implemented system and special purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system of some type, for example LINUX, UNIX, WINDOWS, MAC OS, ANDROID, IOS, or a combination of operating systems.

A computer program, which can also be referred to or described as a program, software, a software application, a unit, a module, a software module, a script, code, or other component can be written in any form of programming language, including compiled or interpreted languages, or declarative or procedural languages. The computer program can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special purpose logic circuitry, for example, a CPU, an FPGA, or an ASIC.

Computers for the execution of a computer program can be based on general or special purpose microprocessors. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media, and memory devices, including by way of example semiconductor memory devices (for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices), magnetic devices (for example, tape, cartridges, cassettes, internal/removable disks), magneto-optical disks, and optical memory devices (for example, digital versatile/video disc (DVD), compact disc (CD)-ROM, DVD+/−R, DVD-RAM, DVD-ROM, high-definition/density (HD)-DVD, and BLU-RAY/BLU-RAY DISC (BD)). The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad, by which the user can provide input to the computer. Input can also be provided to the computer using a touchscreen, such as a tablet computer surface with pressure sensitivity, or a multi-touch screen using capacitive or electric sensing. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component (for example, as a data server), or that includes a middleware component (for example, an application server), or that includes a front-end component (for example, a client computer having a graphical user interface or a Web browser through which a user can interact with an implementation of the subject matter described in this specification), or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, or a combination of communication networks. The communication network can communicate data between network nodes, for example, Internet Protocol (IP) packets, Frame Relay frames, Asynchronous Transfer Mode (ATM) cells, voice, or video.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what can be claimed, but rather as descriptions of features that can be specific to particular implementations of particular concepts. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional) to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations. It should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method, a non-transitory, computer-readable medium storing computer-readable instructions to perform the computer-implemented method, and a computer system comprising a computer memory interoperably coupled with a hardware processor configured to perform the computer-implemented method or the instructions stored on the non-transitory, computer-readable medium.

What is claimed is:

1. A computer-implemented method, comprising:
receiving a plurality of seismic traces associated with a target point in a reservoir;
generating a first angle domain common image gather (ADCIG) based on the received plurality of seismic traces, wherein the first ADCIG is generated by:
performing bifocal imaging on the plurality of seismic traces using detection focusing operators and emission focusing operators;
performing a Radon Transform on results of the bifocal imaging; and
generating the first ADCIG based on results of the Radon Transform;
generating a plurality of synthetic traces associated with the target point;
generating a second ADCIG based on the plurality of synthetic traces; and
generating an enhanced ADCIG using the first ADCIG and the second ADCIG.

2. The computer-implemented method of claim 1, wherein the Radon Transform comprises a double-Rho filter.

3. The computer-implemented method of claim 1, wherein the plurality of synthetic traces is generated based on an acquisition geometry same as that of the received plurality of seismic traces.

4. The computer-implemented method of claim 1, wherein the enhanced ADCIG is generated by dividing the first ADCIG by amplitudes of the second ADCIG.

5. The computer-implemented method of claim 1, wherein the enhanced ADCIG is independent of an acquisition geometry.

6. The computer-implemented method of claim 1, further comprising:

generating a seismic image based on the enhanced ADCIG; and generating drilling parameters based on the seismic image.

7. A non-transitory, computer-readable medium storing one or more instructions executable by a computer system to perform operations comprising:

receiving a plurality of seismic traces associated with a target point in a reservoir;

generating a first angle domain common image gather (ADCIG) based on the received plurality of seismic traces, wherein the first ADCIG is generated by:

performing bifocal imaging on the plurality of seismic traces using detection focusing operators and emission focusing operators;

performing a Radon Transform on results of the bifocal imaging; and generating the first ADCIG based on results of the Radon Transform;

generating a plurality of synthetic traces associated with the target point;

generating a second ADCIG based on the plurality of synthetic traces; and generating an enhanced ADCIG using the first ADCIG and the second ADCIG.

8. The non-transitory, computer-readable medium of claim 7, wherein the Radon Transform comprises a double-Rho filter.

9. The non-transitory, computer-readable medium of claim 7, wherein the plurality of synthetic traces is generated based on an acquisition geometry same as that of the received plurality of seismic traces.

10. The non-transitory, computer-readable medium of claim 7, wherein the enhanced ADCIG is generated by dividing the first ADCIG by amplitudes of the second ADCIG.

11. The non-transitory, computer-readable medium of claim 7, wherein the enhanced ADCIG is independent of an acquisition geometry.

12. The non-transitory, computer-readable medium of claim 7, wherein the operations further comprise:

generating a seismic image based on the enhanced ADCIG; and generating drilling parameters based on the seismic image.

13. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations comprising:

receiving a plurality of seismic traces associated with a target point in a reservoir;

generating a first angle domain common image gather (ADCIG) based on the received plurality of seismic traces, wherein the first ADCIG is generated by:

performing bifocal imaging on the plurality of seismic traces using detection focusing operators and emission focusing operators;

performing a Radon Transform on results of the bifocal imaging; and generating the first ADCIG based on results of the Radon Transform;

generating a plurality of synthetic traces associated with the target point;

generating a second ADCIG based on the plurality of synthetic traces; and generating an enhanced ADCIG using the first ADCIG and the second ADCIG.

14. The computer-implemented system of claim 13, wherein the Radon Transform comprises a double-Rho filter.

15. The computer-implemented system of claim 13, wherein the plurality of synthetic traces is generated based on an acquisition geometry same as that of the received plurality of seismic traces.

16. The computer-implemented system of claim 13, wherein the enhanced ADCIG is generated by dividing the first ADCIG by amplitudes of the second ADCIG.

17. The computer-implemented system of claim 13, wherein the one or more operations further comprise:

generating a seismic image based on the enhanced ADCIG; and generating drilling parameters based on the seismic image.

* * * * *